May 6, 1969 W. D. STINSON, JR 3,443,232

PULSE FORMING CIRCUIT

Filed Feb. 14, 1966

INVENTOR.

WILLIS D. STINSON, JR.

BY

ATTORNEYS 3,443,232

PULSE FORMING CIRCUIT

Willis D. Stinson, Jr., Oakland, Calif., assignor to E-H Research Laboratories, Inc., Oakland, Calif., a corporation of California Filed Feb. 14, 1966, Ser. No. 527,348
Int. Cl. H03k 3/04
U.S. Cl. 328—61 5 Claims This invention is directed to a pulse forming circuit, and more particularly to a circuit for generating an output pulse having relatively short rise and fall times.

It has long been a problem in the prior art to provide a pulse generator which has the capability of producing pulses with rise and fall times of less than one nanosecond. This has only been achieved with partial success since much distortion is usually present in the final output pulse.

It is a general object of the present invention to provide an improved pulse forming circuit.

It is another object of the invention to provide an improved pulse forming circuit which has superior transient capabilities with a minimum of distortion.

It is a further object of the invention to provide a circuit which is simple and economical.

Other objects and features of the invention will be apparent from the accompanying drawing and the following description:

Referring to the drawing.

Figure 1:
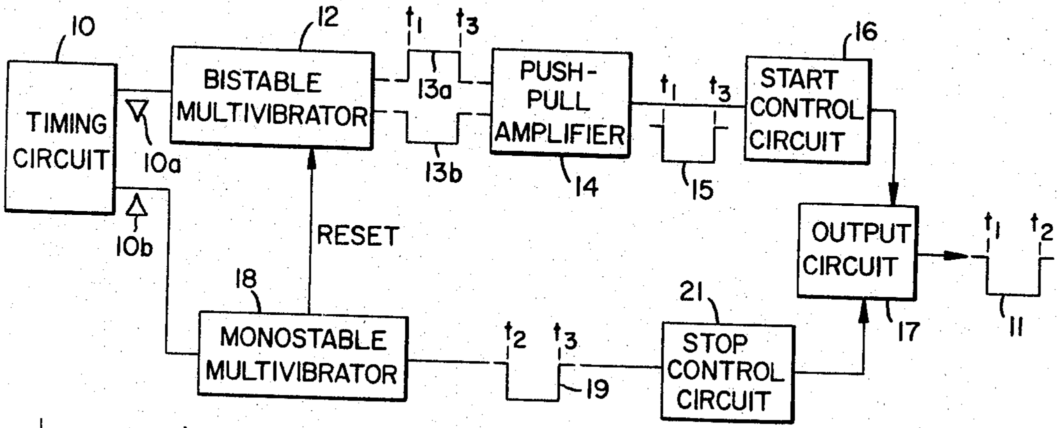
FIGURE 1 is a block diagram of the circuit embodying the invention.
Figure 2:
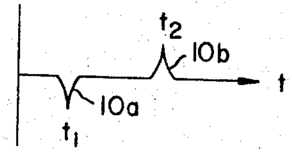
FIGURE 2 illustrates the time relationship of two pulses of the circuit.

Referring to FIGURE 1, timing circuit 10 includes a clock circuit (not shown) and generates triggering pulses 10*a* and 10*b*. Pulse 10*a* corresponds in time to the leading edge or rise portion of an output pulse 11, which is the final output of the pulse forming circuit of the present invention. The initiation of the output pulse has been designated as time $t_1$. The pulse 10*b* corresponds to the termination of the output pulse $t_2$. Pulse 10*a* is coupled to a bistable multivibrator 12 which produces complementary start pulses 13*a* and 13*b*. The leading edge of these pulses occur at the time $t_1$. They are coupled to a push-pull amplifier 14 which provides an output start pulse 15 and is coupled to a start control circuit 16. The start control circuit is coupled in turn to an output circuit 17 which generates output pulse 11.

Pulse 10*b* is coupled to a monostable multivibrator 18 which produces a stop pulse 19 having a leading edge at time $t_2$, and returns to its stable state at time $t_3$, as determined by the characteristics of multivibrator 18. The two multivibrators 12, 18 are coupled together so that at time $t_3$, bistable multivibrator 12 is reset to its original condition. Stop pulse 19 is coupled to stop control circuit 21 which controls the stop mode of output circuit 17 at time $t_2$.

Figure 3:
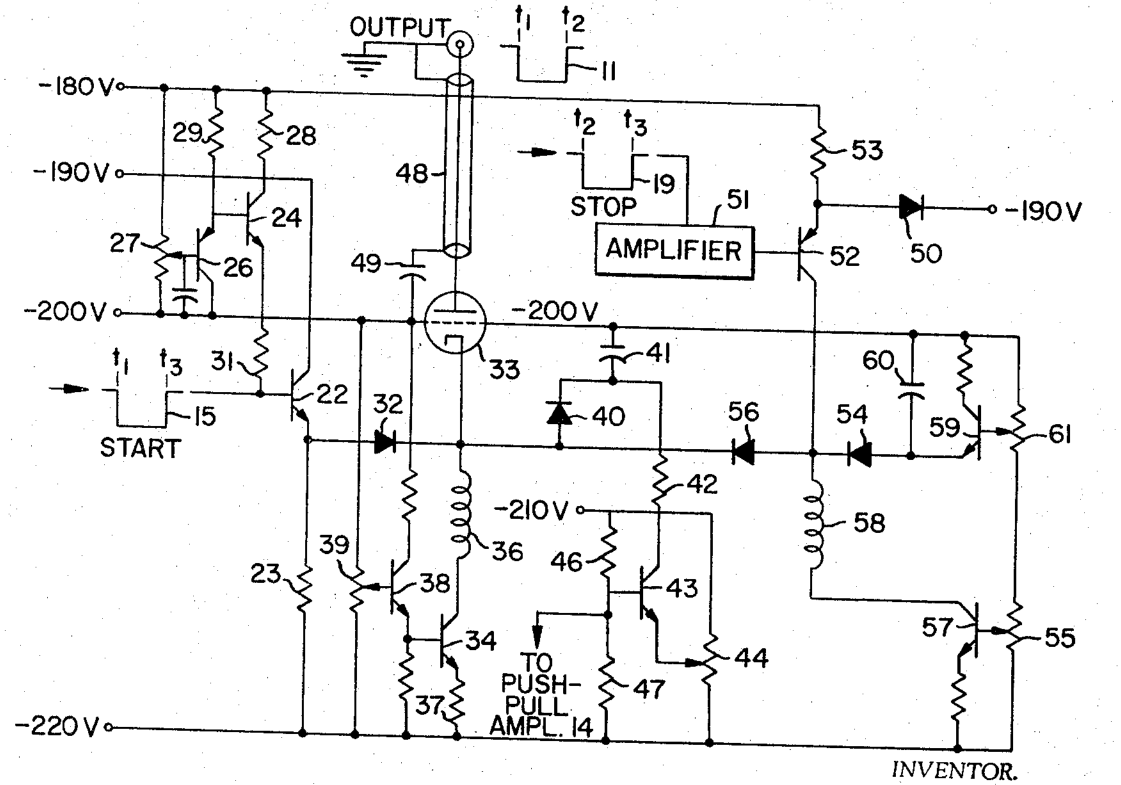
FIGURE 3 is a schematic circuit diagram of a portion of FIGURE 1.

FIGURE 3 is a detailed circuit schematic of the portion of FIGURE 1 which includes the start and stop control circuits 16 and 21 and output circuit 17. Several voltage reference levels are designated with representative voltage values for simplification of the description.

Start pulse 15 is applied to the base of a transistor 22. The collector of the transistor is coupled to a −190 volt level and its emitter to a −220 volt level through a resistor 23. Under normal operating conditions (with no pulse being applied to its base), the transistor is conductive. The emitter potential of the transistor is determined by a biasing circuit which includes ganged transistors 24 and 26. More specifically, a potentiometer 27 coupled to the base of transistor 26 controls the transistor's bias which in turn controls the emitter voltage. Similarly, the emitter voltage of transistor 24 is controlled by the emitter voltage of transistor 26 which is coupled to its base, and finally the emitter voltage of transistor 22 is similarly controlled by transistor 24.

Transistors 24 and 26 have their collector and emitter respectively coupled to a −180 volt reference level through resistors 28 and 29. The collector of transistor 26 is coupled to the −200 volt reference level and the emitter of transistor 24 is coupled through a resistor 31 to the base of transistor 22. Potentiometer 27 is coupled between the −180 volt and −200 volt reference levels. The setting of potentiometer 27 thus determines the quiescent cathode potential of tube 33. Variations in the characteristic of replacement tubes for tube 33 may be compensated for by adjustment of the potentiometer.

During the normal conductive condition of transistor 22, a diode 32, which is coupled between the emitter of transistor 22 and the cathode of an output tube 33, is forward biased and provides a path for diverting current from the cathode.

Cathode current is supplied to output tube 33 through a transistor 34 which has its emitter coupled through a resistor 37 to a −220 volt reference level, and its collector coupled to the cathode through a high frequency isolating choke 36. The base of transistor 34 is controlled by the coupled transistor 38 which in turn is regulated by a base coupled potentiometer 39.

Thus, in summary, under normal conditions, the electron current flows through transistor 43 and choke 36 through the forward biased diode 32 through transistor 22 to the 190 volt level. The cathode of tube 33 in this condition is maintained at a voltage of approximately −197 volts (due to voltage drops through transistor 22 and diode 32), thus making it positive with respect to the grid potential which is maintained at a −200 volt reference level.

During the quiescent, non-conductive condition of the tube 33, forward current is also supplied to a step recovery type diode 40 which is coupled between the cathode of tube 33 and the −200 volt reference level through a series connected capacitor 41. The cathode of the diode is also coupled by a series resistor 42 to the collector of a transistor 43 which serves as the current supply for the diode. Transistor 43 regulates the forward current in the diode by means of a potentiometer 44 coupled to its emitter. Both the base and emitter of transistor 43 are referenced between the −210 volt and −220 volt levels; the emitter by means of potentiometer 44 and the base by being connected between series resistors 46 and 47 which are connected between the two voltage references. The base of transistor 43 is also coupled to push-pull amplifier 14 (FIGURE 1) so that the transistor is rendered non-conductive during a start pulse.

The plate or anode of output tube 33 is connected to an output terminal, on which output pulse 11 appears, by a coaxial transmission line 48. A capacitor 49 is coupled between the outer conductor of the line and the control electrode of tube 33 to provide a high frequency bypass.

Capacitor 41 is charged by the flow of current between the −200 volt level and the more positive cathode level. As will be discussed later, a portion of the stored charge in this capacitor will be drained off by the reverse current through the step recovery type diode 40.

Before discussing the operation of the start control circuit, the exact functioning and characteristics of a step recovery type diode should be understood. The step recovery diode is a class of diode which has been optimized for finite, controlled storage of minority carriers which allows it to have a reverse current conduction, until the carriers are depleted, coupled with a very abrupt transition from this reverse storage conduction to cutoff. In fact, the conductivity versus time dependence of this type of diode closely proximates a step function. From a point of view, the abrupt transition is accomplished by establishing a high built-in field at the junction of the diode which confines the stored minority charge close to the junction.

In operation, a start pulse 15 is applied to the base of transistor 22 and tends to shut off the transistor. This pulls the emitter more negative and diode 32 thereby becomes reverse biased. The current formerly flowing through diode 32 from transistor 34 and the associated circuitry is maintained by the reverse conduction storage characteristic of step recovery diode 40. This allows the start pulse 15 to obtain its full value before any switching takes place. Thus, the cathode of tube 33 is still maintained at a sufficiently more positive value than the grid to keep it in its off condition. During the start pulse, no more forward current is attempted to be supplied to diode 40 through transistor 43 since the transistor is turned off by means of its connection to push-pull amplifier 14 (FIGURE 1).

Reverse current continues to flow through diode 40 until the minority carriers are exhausted and at this point an abrupt transition occurs, cutting off the diode and preventing any further diversion of current from the cathode of tube 33, thereby allowing the cathode to go negative with respect to the grid. Conduction in the tube is initiated and the leading edge of the output pulse designated time $t_1$ is formed which has a rise time of a fraction of a nanosecond. This leading edge is determined by the very abrupt transition characteristic of step recovery diode 40 which in turn is enabled by the high ratio of transconductance to input capacitance of tube 33. Capacitor 41, which was previously charged, supplies the reverse current, and as discussed above, has sufficient energy storage that only a portion of its charge is depleted during reverse conduction.

Conduction of output tube 33 continues until a stop pulse 19 is received from the monostable multivibrator 18 (FIGURE 1). Stop pulse 19 is applied to an amplifier 51 at time $t_2$. As mentioned above, at some later time, $t_3$, the entire pulse forming circuit is returned to its quiescent state and is ready for the next pulse.

The stop control circuitry includes a transistor 52 having its base coupled to amplifier 51 and its emitter connected to the −180 volt level through a resistor 53 and to the −190 volt level through a diode 50. The collector is connected to the cathode of a step type recovery diode 54 and the anode of a diode 56 which has its other terminal coupled to the cathode of tube 33. A capacitor 61 is connected between the anode of diode 54 and the −200 volt level and is normally in a charged condition.

Forward current through diode 54 is controlled by a transistor 57 which has its collector coupled to the diode through a choke 58. Transistor 57 is regulated by a base coupled potentiometer 55. The voltage at the anode of diode 54 is controlled by a transistor 59 which is coupled to a potentiometer 61. The combination of transistor 59 adjusting the voltage at the anode of diode 54 and the adjustment of the forward current through diode 54 by transistor 57 holds the anode of diode 56 sufficiently negative with respect to the −200 volt reference value so that it is reverse biased and non-conductive. Transistor 52 is also non-conductive because of a base bias voltage applied by amplifier 51.

Thus, during the quiescent period when no stop pulse is being applied, transistor 57 supplies forward current to step recovery diode 54 to store minority carriers in it in preparation for an abrupt transition during reverse conduction. On application of the stop pulse to amplifier 51, transistor 52 is rendered conductive. Current formerly flowing to the −180 volt level through resistor 53 and diode 50 from the −190 volt level now flows through transistor 52. This is accomplished with a relatively small driving voltage at the base. Reverse current is carried by diode 54 through the transistor 52 and through capacitor 60 which begins to discharge. By the time step recovery diode 54 abruptly stops reverse conduction, transistor 52 has reached full conduction. Diode 56 is abruptly forward biased by the attendant rise in voltage since diode 54 no longer clamps the anode of the diode to the emitter voltage of transistor 59. The electron current formerly flowing to the cathode of tube 33 is now diverted through transistor 52 to the −180 volt level. Again, as in the case of the leading edge of the output pulse, a sharp transition is achieved for the trailing edge because of the reverse current characteristic of step recovery diode 54. This allows a sharp forward biasing pulse to be applied to diode 56 which then diverts the cathode current of tube 33, making it positive with respect to the grid and rendering it non-conductive. A fall time of a fraction of a nanosecond is thereby achieved.

The above condition is maintained until time $t_3$ when both the stop and start pulses are discontinued because of the resetting actions of multivibrator 18, discussed in conjunction with FIGURE 1, and the entire circuit is returned to its quiescent or normal condition.

In order to achieve the rapid rise and fall times of the present invention, undesired capacitive and inductive effects must be minimized. More specifically, output tube 33 shold have a relatively low plate to grid capacitance and a high ratio of transconductance to input capacitance. A tube of this type is a metal ceramic triode manufactured by the General Electric Corporation and designated "G.E. 7768." Such a tube typically has a plate to cathode capacitance of 1.7 picofarads, a transconductance of 50,000 micromhos, and an input capacitance of 6.0 picofarads. Care must also be taken in constructing capacitors such as capacitor 41 so as not to have unduly long leads. With the use of printed circuit techniques, such leads can almost be eliminated.

In conclusion, a pulse forming circuit has been provided which produces a pulse having rise and fall times of a fraction of a nanosecond, distortion is minimized, and the use of step recovery diodes renders the circuit relatively simple and economical.

I claim:

1. In a pulse forming circuit for generating an output pulse having short rise and fall times, an amplifier having a cathode, a control electrode and an anode, said control electrode being coupled to a voltage reference level holding such electrode at a fixed predetermined voltage level, output means coupled to said anode, means for varying the potential of said cathode within a predetermined range, such range including said voltage reference level, such means including a current source coupled to said cathode and means for diverting current from said cathode to maintain such amplifier in a quiescent, non-conductive condition, control means including electronic switching means having an abrupt transition from a closed to a open condition and responsive to start and stop pulses for preventing said diversion of current in response to said start pulse to place said amplifier in a conductive condition and restoring said diversion of said cathode current in response to a stop pulse to place said amplifier in said quiescent, non-conductive condition, the transition from said non-conductive to said conductive condition corresponding to said rise time of said output pulse and the transition from said conductive to said non-conductive condition corresponding to said fall time.

2. In a pulse forming circuit as in claim 1 in which said switching means include step recovery diode means.

3. In a pulse forming circuit as in claim 2 in which said control means includes a step recovery diode having a reverse storage conduction capability for temporarily conducting said diversion current in response to said start pulse and thereafter having an abrupt transition from reverse conduction to cut-off to prevent said diversion causing said amplifier to become conductive.

4. In a pulse forming circuit as in claim 2 in which said control means includes a step recovery diode, normally forward biased, having a reverse storage conduction capability coupled with an abrupt transition to cut-off and coupled to a second diode which is normally reversed biased, such diode being coupled to said cathode, said step recovery diode in response to said stop pulse being reversed biased causing the attendant flow of reverse conduction current, said step recovery diode causing said second diode to become forward biased in response to said step recovery diode's abrupt transition to shut-off to restore said current diversion through said second diode thereby placing said amplifier in said non-conductive condition.

5. A pulse forming circuit as in claim 1 in which said amplifier has a high ratio of transconductance to input capacitance.

References Cited

UNITED STATES PATENTS

| | | | |
|---|---|---|---|
| 3,076,902 | 2/1963 | Van Duzer et al. | 307—265 XR |
| 3,184,605 | 5/1965 | Herzog | 307—265 |
| 3,191,062 | 6/1965 | Forge | 307—268 XR |
| 3,200,267 | 8/1965 | Cubert | 307—268 XR |
| 3,391,286 | 7/1968 | Locasale et al. | 307—319 XR |

ARTHUR GAUSS, *Primary Examiner.*

STANLEY T. KRAWCZEWICZ, *Assistant Examiner.*

U.S. Cl. X.R.

307—256, 265, 268, 319